United States Patent [19]

Huang

[11] Patent Number: 4,950,534

[45] Date of Patent: Aug. 21, 1990

[54] MODIFIED CAR ROOF TRIM BOARD STRUCTURE

[76] Inventor: San Y. Huang, 2 Lane 164, Pai-Lin 5th Rd., Pei-Tou, Taipei, Taiwan

[21] Appl. No.: 316,923

[22] Filed: Feb. 28, 1989

[51] Int. Cl.⁵ .............................................. B32B 3/26
[52] U.S. Cl. .............................. 428/314.4; 428/317.1; 428/317.7; 428/319.3
[58] Field of Search ............... 428/319.1, 314.4, 314.8, 428/317.1, 317.7, 318.6, 319.3, 319.7

[56] References Cited

FOREIGN PATENT DOCUMENTS 3705937  9/1988  Fed. Rep. of Germany ... 428/319.1
2021038  11/1979  United Kingdom ............ 428/317.1

Primary Examiner—William J. Van Balen
Attorney, Agent, or Firm—Bucknam and Archer

[57] ABSTRACT

A modified car roof trim board structure including a polymer foam of close cell covered with one layer of mylar film at the top as well as at the bottom to form a heat insulating layer to prevent transmission of outside radiating heat into the car during summer, to prohibit inner heat from transmission out of the car during the winter season, and further, to regulate temperature differences without the need for air conditioners, so as to reduce fuel oil consumption of a car.

1 Claim, 1 Drawing Sheet

U.S. Patent
Aug. 21, 1990
4,950,534
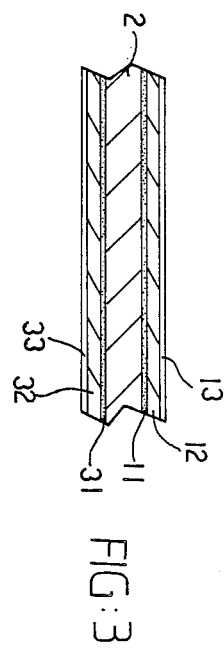
FIG:3
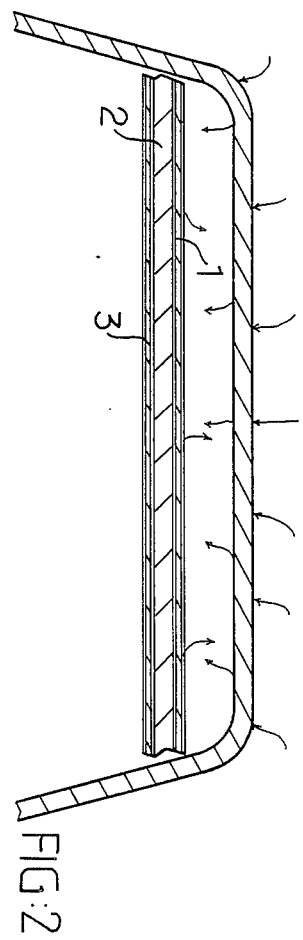
FIG:2
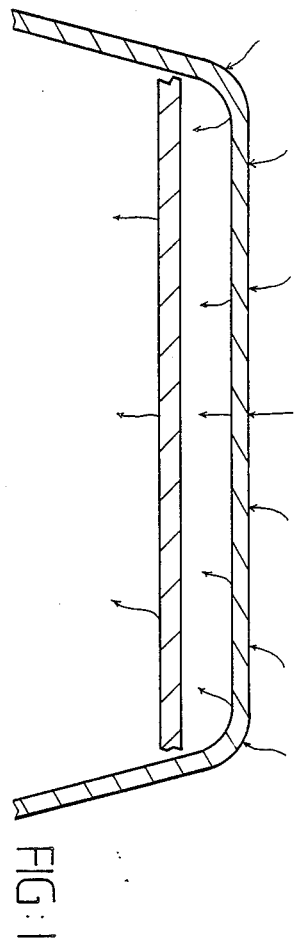
FIG:1

MODIFIED CAR ROOF TRIM BOARD STRUCTURE

BACKGROUND OF THE INVENTION

Following the fast development in technology, transportation vehicles are drastically improved accordingly. At the present time, the number of automobiles has become one of the national economic indexes in developing countries.

In order to provide weather protective effects a car must basically be well enclosed. For best performance in the most economical way, it requires a minimized car body provided with a maximized inner space.

When seating in a driver's seat to drive a car for a certain period of time, one may feel uncomfortable due to confined space, and may feel exhausted and tired out very quickly. In such a moving and narrow space, it is rather difficult to protect against the weather. For example, during the hot summertime, the summer heat is transmitted into the inner space of a car through car roof after the car is exposed to the sun for a certain period of time, and the inner space of the car is immediately filled with steaming heat. During the cold winter, the outside cold temperature is induced into the car through car roof to make the inner space of the car become icy cold.

Regular car roof trim board structure consists of one layer of PU or EVA sheet attached to the metal plate roof to buffer heat transmission. In order to provide comfortable temperature, regular cars are usually equipped with an air conditioner to regulate the temperature according to outside weather. However, it wastes a lot of power and consumes extra gasoline since regular car roof trim structure couldn't provide good heat insulation effect. Because regular car roof insulation layer is made of open cell PU or EVA foam sheet, after having been indirectly radiated by sunlight for a certain period of time, it absorbs heat and transmits downward about 40% of the heat absorbed into the car. In the winter season, it transmit the heat in reverse direction, that is, it transmits the heat from human body to the outside beyond the car.

In view of said problem, the present invention provides a modified car roof trim board structure to provide better heat insulation effect.

BRIEF DESCRIPTION OF THE DRAWINGS

FIG. 1 is a sectional view of the prior art.

FIG. 2 is a sectional view of a car roof trim board structure constructed according to the present invention.

FIG. 3 is a sectional view of the heat insulating layer of the present invention.

DETAILED DESCRIPTION OF THE PREFERRED EMBODIMENT

Referring to FIGS. 2 and 3, a car roof trim board structure is comprised of an upper reflecting laminate (1), an intermediate heat insulating layer (2), and a lower reflecting laminate (3).

The upper reflecting laminate (1) comprises a basic layer (11) made of polyester film covered with an upper layer (13) of mylar film at the top by means of vacuum electroplating method, and covered with a bottom layer (12) by means of PE coating method.

The intermediate heat insulating layer (2) is made of polymer foam of close cell, for example, PE foam.

The lower reflecting laminate (3), similar to the structure of the upper reflecting laminate (1), comprises a basic layer (31) of polyester film coated with one upper layer of PE coating (32) at the top, and coated with one bottom layer (33) of mylar film at the bottom by means of vacuum electroplating method.

The upper reflecting laminate (1), the intermediate heat insulating layer (2), and the lower reflecting laminate (3) are firmly attached together by means of a heat pressing process. Because of the intermediate hear insulating layer (2), the bottom layer (12) of the upper reflecting laminate (1), and the upper layer (32) of the lower reflecting laminate (3) are all made of PE material, upon heat pressing, they are immediately formed into an integral unit.

If the structure is installed inside the metal roof of a car, when the car is exposed to the sunlight during summertime, about 95% of the heat will be reflected back to the car metal roof as soon as the radiating heat is transmitted to the upper layer of mylar film (13), and only about 5% of the heat will be absorbed by the mylar film and further transmitted to the intermediate heat insulating layer (2). Because the intermediate heat insulating layer (2) is made of polymer foam of close cell which provides good heat insulation effect, only about 20% of the heat it absorbed is transmitted through the lower reflecting laminate (3) into the inner space of the car. Therefore, the radiating heat which penetrates into the inner space of the car is below 1%.

During winter season, the inner temperature of a car is higher than the outside air. Therefore, the heat is transmitted in reverse direction, that is, less than 1% of the heat produced from the human body is transmitted out of the car through the car roof trim board structure of the present invention.

Therefore, the present invention provides good temperature regulating effect. When the car roof trim board structure of a car is constructed according to the present invention, the car may be used to provide good temperature regulating effect with using any air conditioner.

In general, the present invention is to provide such a car roof trim board structure having numerous features each of which tends to make the structure more practical to provide good heat insulating property.

As indicated, the structure herein may be various embodied. The materials used may be diversified. Recognizing various modifications will be apparent, the scope hereof shall be deemed to be defined by the claim as set forth below.

I claim:

1. An automobile roof having in the interior surface a structure including:
   (a) an upper reflecting laminate (1) comprising a a basic layer (11) of polyester covered by an upper layer of a metallic film layer (13), said metallic film being coated by a layer (12) of polyethylene by vacuum electroplating;
   (b) an intermediate heat insulating layer (2) made of polyethylene foam;
   (c) a lower reflecting laminate (3) comprising a basic layer of a polyester (31) coated with an upper layer of polyethylene (32), said polyethylene layer (32) being covered by a metallic film (33) by vacuum electroplating,
   said layer (1), (2) and (3) being attached to one another by heat pressing.

* * * * *